United States Patent Office …

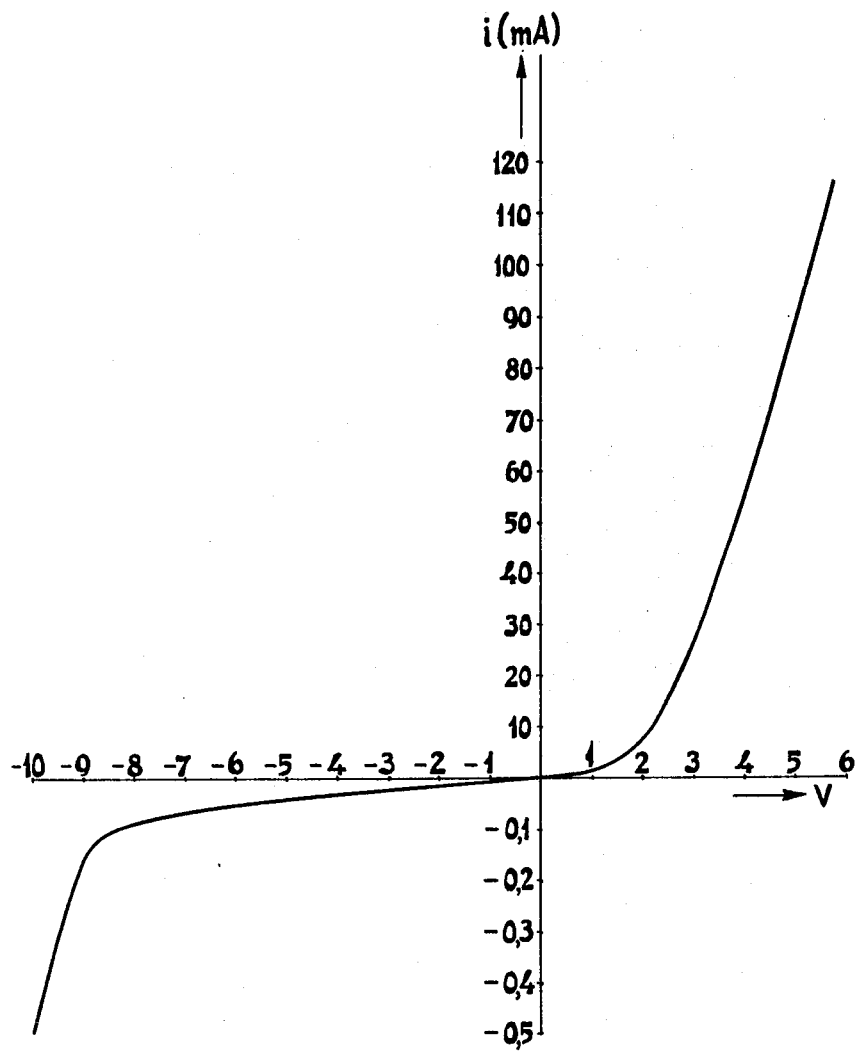

3,256,210
Patented June 14, 1966

3,256,210
METHOD OF MANUFACTURING COMPACT BODIES OF MANGANIC OXIDE AND/OR IRON OXIDE AND BODIES THUS OBTAINED
Johan Christiaan Willem Kruishoop, Emmasingel, Eindhoven, Netherlands, assignor to North American Philips Company, Inc., New York, N.Y., a corporation of Delaware
Filed Jan. 25, 1962, Ser. No. 168,764
Claims priority, application Netherlands, Feb. 2, 1961, 260,778
7 Claims. (Cl. 252—519)

The invention relates to a method of manufacturing compact bodies of manganic oxide and/or iron oxide.

It is known that manganese salts derived from volatile, oxidizing acids decompose, when heated, into manganic dioxide ($MnO_2$), sesquioxide of manganese ($Mn_2O_3$) or $Mn_3O_4$ in accordance with the temperature. The following equilibriums play a part in this case; for example when heated in air:

$$MnO_2 \underset{530° C.}{\rightleftarrows} Mn_2O_3 \underset{940° C.}{\rightleftarrows} Mn_3O_4$$

By heating solid manganese nitrate at a temperature of about 200° C., manganic dioxide can be obtained in accordance with the equation:

$$Mn(NO_3)_2 \rightarrow MnO_2 + 2NO_2$$

and from $Fe(NO_3)_3$ in a similar manner $Fe_2O_3$ can be obtained. The manganic dioxide then has the form of a fine microcrystalline powder. When heating the manganese nitrate in air at a temperature above 530° C. but below 940° C., sesquioxide of manganese is obtained also in the form of fine powder. When heating at a temperature above 940° C., a gradual sintering occurs according as the temperature increases, but in this manner only bodies consisting of $Mn_3O_4$ can be manufactured as it appears from the above equilibrium data.

In accordance with the invention compact bodies of manganic oxide and/or iron oxide can be manufactured by using the aforesaid, known reactions by dripping a solution of a salt of these metals derived from a volatile, oxidizing acid into a mold, heated at a temperature with which pyrolysis of the said salt occurs. The mold is then removed and the body thus obtained may be subjected, for controlling the valence of the ions from which it is composed, to an after-treatment, particularly oxidation.

The solution must, of course, be dripped in at a sufficiently low rate, so that the water vapor and the decomposition products formed can escape. The concentration is, of course, chosen at not too low a value; it is preferable to use a saturated solution. It will be obvious that the section of the mold should not be too small and neither be too large. In the first case that is the risk that the drops do not reach the bottom of the vessel, but are deposited on the side wall at a higher level in the mold, so that at this place the mold becomes blocked and cavities are formed in the body. When a mold with too large a diameter is chosen, cavities are very likely to occur, since there is too great a temperature difference between the wall and the center of the mold, the thermal conductivity of manganic oxide being failrly low.

Round bars may, for example, be manufactured with a diameter lying between 8 and 11 mms. without any difficulty by using tubes having the said inner diameter.

The rate of dripping should, of course not be too high also with a view to the heat capacity of the mold, since otherwise the temperature of the mold will differ materially from the temperature required for the reaction.

In the embodiment of the method described above in which no after-treatment is carried out, $Mn(NO_3)_2$ can provide compact bodies consisting of manganic oxide of the nominal composition $MnO_{1.86}$ 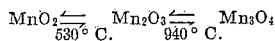 $MnO_{1.96}$ in accordance with the temperature of the reaction. These bodies have a porosity of about 5% and an electric resistivity of about 0.2 ohm-cm. In a similar manner an iron salt derived from a volatile, oxidizing acid can provide bodies of iron oxide. From X-ray diffraction diagrams it appears that this iron oxide consists of the $\alpha$-$Fe_2O_3$ modification. Within the scope of the invention compact bodies can be manufactured of which the specific conductivity is varied by adding to the nitrate solution a soluble compound of which the ions are absorbed in a different valence in the lattice of manganic oxide and/or iron oxide.

In a further preferred embodiment of this method the molded bodies are subjected to an after-treatment so that either bodies consisting mainly of manganic dioxide with a nominal composition of $MnO_{1.996 \pm 0.003}$ 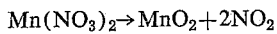 or bodies consisting of $Mn_2O_3$ are formed.

In order to obtain compact bodies consisting mainly of $MnO_2$ the bodies obtained by dripping in the heated mold are heated with concentrated nitric acid at a temperature of about 150° C. in Carius tubes.

The porosity of the bodies thus obtained amounts to about 7%. The electric resistivity is about 5 ohm-cm. By heating the bodies thus treated at a temperature below the decomposition point of $MnO_2$ (530° C.) in an oxidizing atmosphere, for example air, this resistivity can be reduced to 0.5 ohm-cm.

A different after-treatment within the scope of the invention consists in heating the bodies in a concentrated, aqueous solution of hydrofluoric acid. The bodies thus obtained excel by a high hardness and have an electric resistivity of 0.2 to 0.3 ohm-cm. The composition of this product corresponds approximately to the formula $MnO_{1.94}F_{0.04}$. The manganese is found herein partly in a bivalent form.

Finally, by dripping a manganese salt solution into a mold heated at a temperature of not more than 530° C., preferably between 200° C. and 300° C. and by using an after-treatment by heating the bodies first formed at a temperature between 530° C. and 940° C., compact bodies can be manufactured, which consist of sesquioxide of manganese ($Mn_2O_3$).

The bodies according to the invention, consisting mainly of manganic dioxide, may be used for the manufacture of rectifying elements. To this end the surface of the body is coated with a layer of a so-called valve metal. By forming subsequently this body, for example by heating in an inert atmosphere, an oxide layer is formed between the $MnO_2$ and the valve metal, this oxide having the properties of a blocking layer.

The bodies according to the invention of $Mn_2O_3$ may be successfully used as resistors having a negative temperature coefficient. An important advantage of the resistors thus manufactured is that they have perfectly reproducable values of the resistance and of the temperature coefficient, whilst they are highly insensitive to impurities of the starting substances, provided no ions having a valence deviating from $Mn^{+++}$ are thus introduced into the lattice.

By doping the $Mn(NO_3)_2$-solution with compounds which exhibit the last-mentioned phenomenon, the resistance value can be varied, whilst the temperature coefficient remains equal to that of pure $Mn_2O_3$. The addition of Cu-compounds appeared to yield the best results in this case. It also appeared that a content of fluoride ions was favorable.

The $\alpha$-$Fe_2O_3$ manufactured in accordance with the invention may be used successfully as a starting material for all kinds of known sintering processes, for example for manufacturing ferrites. The method according to the invention can then replace the conventional grinding and presintering processes. An important advantage resides in that all kinds of additions can be easily doped in the $Fe(NO_3)_3$-solution and that the $Fe_2O_3$ obtained contains these additions in a considerably more homogeneous distribution than is attainable by the conventional presintering method.

EXAMPLES (1) Into a glass tube having an inner diameter of 10 mms. and closed at the bottom and heated at a temperature of 230° C. is dripped a solution of 525 gs. of $Mn(NO_3)_2 \cdot 2H_2O$ per liter of a solution containing furthermore 4 gs. equivalent of $HNO_3$ per liter, at a rate of one drop per 30 seconds. After a rod of a length of about 5 cms. has thus been formed, the surrounding tube is removed. A compact body is obtained, which consists of manganic oxide of the nominal composition $MnO_{1.96}$ with a resistivity of 0.2 ohm-cm.

(2) A number of the rods manufactured in accordance with Example 1 is heated at 150° C. in closed Carius tubes containing concentrated nitric acid. The bodies obtained exhibit lines in the X-ray diagram which are to be solely attributed to $MnO_2$; they have a density of 93% of the X-ray density of $MnO_2$. The size of the crystallites is about $1/\mu$. A chemical analysis exhibits a composition of $MnO_{1.996 \pm 0.003}$. The resistivity of these bodies is 5 ohm-cm.; subsequent to heating of the bodies at a temperature of 400° C. in air this value drops to 0.5 ohm-cm.

(3) The rods manufactured in accordance with Example 1 are held for one hour in a boiling, 10% solution of hydrofluoric acid in water. After this treatment the rods have a chemical composition of $MnO_{1.94}F_{0.04}$ and an electric resistivity of 0.2 to 0.3 ohm-cm.

(4) A number of rods obtained in accordance with the above example is provided with a zinc layer by the Schoop's method. Then they are heated for 12 hours at a temperature of 380° C. in pure nitrogen. The rectifying properties are measured on a contact surface of 1 cm.$^2$. The accompanying drawing shows the measured current-voltage curve. The zinc is negative in the pass direction of the current. The axis of the current intensity in the negative sense is enlarged 100 times with respect to that in a positive sense.

(5) The rods manufactured in accordance with Example 1 are heated for 12 hours at a temperature of 700° C. in air. They thus have a composition of $Mn_2O_3$. The density of the bodies is 5.03, which is 85% of the X-ray density of $Mn_2O_3$.

(6) A number of $Mn_2O_3$ rods obtained in accordance with Example 5, are sawed into discs of 10 mms. and the end faces are then silver-plated in known manner with the aid of a silver paste and provided with connecting wires. Rods manufactured by dripping in accordance with Example 1 are treated in the same manner, but the $Mn(NO_3)_2$-solution contained, in addition, $Fe(NO_3)_3$ in a quantity of 1 mol percent relative to the $Mn(O_3)_2$; they are then heated as indicated in Example 5.

The resistance values of these bodies are measured at temperatures of 25° C. and 50° C. with an accuracy of 0.01° C.

The measurements are repeated after the discs have been aged for 140 and 500 hours respectively by heating at 150° C.

The following table contains the measuring results obtained from bodies (1 to 4) of $Mn_2O_3$ and from bodies (5) of $Mn_2O_3$ plus 1 mol percent of $Fe_2O_3$.

Table

| Sample | 1 | 2 | 3 | 4 | 5 |
|---|---|---|---|---|---|
| Apparent mold factor (surface/length) | 0.695 | 0.705 | 0.635 | 0.706 | 0.678 |
| Resistance at 25° C, measured directly ($\Omega \cdot 10^{-3}$) | 6.25 | 7.90 | 7.94 | 6.71 | 6.00 |
| Resistance at 50° C., measured | 2.57 | 3.16 | 3.20 | 2.72 | 2.48 |
| Resistance at 25° C. after ageing for 140 hours ($\Omega \cdot 10^{-3}$) | 6.37 | 8.24 | 8.11 | 6.80 | 6.23 |
| Resistance at 50° C., after ageing for 140 hours ($\Omega \cdot 10^{-3}$) | 2.57 | 3.33 | 5 3.25 | 5 2.75 | 5 2.56 |
| Resistance at 25° C. after ageing for 500 hours ($\Omega \cdot 10^{-3}$) | 6.37 | 8.23 | 8.09 | 6.78 | 6.20 |
| Resistance at 50° C. after ageing for 500 hours ($\Omega \cdot 10^{-3}$) | 5 2.56 | 3.37 | 3.26 | 5 2.75 | 2.56 |
| Resistivity at 25° C. after ageing for 500 hours ($\Omega \cdot cm. 10^{-3}$) | 4.43 | 5.80 | 5.14 | 4.79 | 4.20 |
| Temperature coefficient of the resistivity (percent/° C.) | −3.69 | −3.63 | −3.69 | −3.66 | −3.59 |

(7) An aqueous solution of the kind used in Example 1, containing in addition $Cu(NO_3)_2$ in quantities of 1.37 and 13.7 mol percent relative to the manganese nitrate is employed for producing compact rods of the kind described in the said example. After the rods thus obtained have been freed from the surrounding tubes, they are heated in air at a temperature of 700° C. for 16 hours. The average resistivity values of the discs sawed from the rods are for the bodies of $Mn_2O_3$ with 1.37 mol percent CuO $2.68 \cdot 10^3$ ohm-cm. and for those with 13.7 mol percent of CuO 482 ohm-cm. The temperature coefficients of the resistors are 3.4 and 3.1 percent/° C. respectively.

(8) Compact rods consisting of $\alpha$-$Fe_2O_3$ are produced by dripping, in the manner described in Example 1, a concentrated nitric-acid containing solution of ferrinitrate in 96.96 gs. thereof in 150 mls. into a heated glass tube having an inner diameter of 10 mms., the dripping rate being one drop per 30 seconds.

What is claimed is:
1. A method of manufacturing compact bodies which method comprises: heating a mold to a temperature at which pyrolysis of a salt selected from the group consisting of manganese and iron salts of volatile oxidizing acids occurs, adding dropwise a solution of said salt into said heated mold to thereby cause pyrolysis of said salt and then removing the mold from the resultant compact metal oxide body.

2. A method of manufacturing compact bodies which method comprises: heating a mold to a temperature at which pyrolysis of a manganese salt of a volatile oxidizing acid occurs, adding dropwise a solution of said salt into said heated mold to thereby cause pyrolysis of said salt and then removing the mold from the resultant compact metal oxide body.

3. A method of manufacturing compact bodies consisting essentially of $MnO_2$ which method comprises: heating a mold to a temperature at which pyrolysis of a manganese salt of a volatile oxidizing acid occurs, adding dropwise a solution of said salt into said heated mold to thereby cause pyrolysis of said salt, removing the mold from the resultant compact metal oxide body, placing said body in concentrated nitric acid and then heating said body to a temperature of about 150° C. while said body is in the concentrated nitric acid.

4. A method of manufacturing compact bodies consisting essentially of $MnO_2$ which method comprises: heating a mold to a temperature at which pyrolysis of a manganese salt of a volatile oxidizing acid occurs, adding dropwise a solution of said salt into said heated mold to thereby cause pyrolysis of said salt, removing the mold from the resultant compact metal oxide body, placing said body in concentrated nitric acid, heating said body to a temperature of about 150° C. while in concentrated nitric acid, then removing said body from the nitric acid and then heating said body in an oxidizing atmosphere at a temperature below 530° C. but high enough to reduce the resistivity of the resultant body to about 0.5 ohm-cm.

5. A method of manufacturing compact bodies consisting essentially of $MnO_2$ which method comprises: heating a mold to a temperature at which pyrolysis of a manganese salt of a volatile oxidizing acid occurs, adding dropwise a solution of said salt into said heated mold to thereby cause pyrolysis of said salt, removing the mold from the resultant compact metal oxide body and then placing said body in a boiling solution of hydrofluoric acid for a time sufficient to convert the manganese to a product substantially corresponding to the formula $MnO_{1.94}F_{0.04}$.

6. A method of manufacturing compact bodies consisting essentially of $Mn_2O_3$ which method comprises: heating a mold to a temperature between 200° C. and 300° C., slowly adding dropwise a solution of a manganese salt of volatile oxidizing acid into said mold, removing the mold from the resultant compact body and then heating said compact body in an oxidizing atmosphere at a temperature between about 530° C. and 940° C.

7. The method of claim 6 in which the oxidizing atmosphere is air.

References Cited by the Examiner
UNITED STATES PATENTS

| | | | |
|---|---|---|---|
| 2,258,646 | 10/1941 | Grisdale | 252—519 |
| 2,282,944 | 5/1942 | Dearborn et al. | 252—518 XR |
| 2,329,511 | 9/1943 | Christensen | 252—518 |
| 2,626,445 | 1/1953 | Albers-Schoenberg. | 252—518 XR |

OTHER REFERENCES

Mellor: Comprehensive Treatise on Inorganic and Theoretical Chemistry, Longmans, Green and Co., London, vol. 13 (1934), page 779, and vol. 12 (1932), page 246.

JULIUS GREENWALD, *Primary Examiner.*

R. D. LOVERING, *Assistant Examiner.*